(12) United States Patent
Buck, Jr. et al.

(10) Patent No.: US 10,896,596 B2
(45) Date of Patent: Jan. 19, 2021

(54) SYSTEMS AND METHODS FOR DEVICE LOAD TRANSFER IN A HYBRID MONITORING SYSTEM

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(73) Assignee: BI Incorporated, Boulder, CO (US)

( * ) Notice: Subject to any disclaimer, the term of this patent is extended or adjusted under 35 U.S.C. 154(b) by 216 days.

(21) Appl. No.: 16/221,494

(22) Filed: Dec. 15, 2018

(65) Prior Publication Data

US 2019/0204903 A1 Jul. 4, 2019

Related U.S. Application Data

(60) Provisional application No. 62/612,650, filed on Jan. 1, 2018.

(51) Int. Cl.
| | | |
|---|---|---|
| G08B 25/01 | (2006.01) | |
| G08B 21/22 | (2006.01) | |
| H04W 4/029 | (2018.01) | |
| H04L 29/08 | (2006.01) | |
| G06Q 50/26 | (2012.01) | |

(Continued)

(52) U.S. Cl.
CPC ....... *G08B 25/016* (2013.01); *G01C 21/3461* (2013.01); *G01S 5/0027* (2013.01); *G06F 1/3212* (2013.01); *G06F 1/3296* (2013.01); *G06Q 50/26* (2013.01); *G08B 21/0258* (2013.01); *G08B 21/0269* (2013.01); *G08B 21/0288* (2013.01); *G08B 21/182* (2013.01); *G08B 21/22* (2013.01); *G08B 21/24* (2013.01); *G08B 25/10* (2013.01); *H04L 67/22* (2013.01); *H04L 67/36* (2013.01); *H04W 4/021* (2013.01); *H04W 4/029* (2018.02); *H04W 52/028* (2013.01); *H04W 52/0277* (2013.01); *G01S 2205/002* (2013.01); *G01S 2205/008* (2013.01)

(58) Field of Classification Search
CPC ..... G01C 21/20; G01C 21/3461; G01S 19/14; G01S 2205/002; G01S 2205/008; G01S 5/0027; G06F 1/163; G06F 1/3209; G06F 1/3212; G06F 1/3215; G06F 1/3287; G06F 1/3296; G06Q 50/26; G08B 21/0258; G08B 21/0261; G08B 21/0269; G08B 21/0286; G08B 21/0288; G08B 21/182; G08B 21/22; G08B 21/24; G08B 25/016; G08B 25/10; H04L 67/22; H04L 67/36; H04W 4/021; H04W 4/029; H04W 52/0277; H04W 52/02

See application file for complete search history.

(56) References Cited

U.S. PATENT DOCUMENTS

| | | |
|---|---|---|
| 4,724,427 A | 2/1988 | Carroll |
| 5,731,757 A | 3/1998 | Layson |

(Continued)

FOREIGN PATENT DOCUMENTS

| | | |
|---|---|---|
| WO | WO/1998/08204 | 2/1998 |
| WO | WO/2000/077688 | 12/2000 |

*Primary Examiner* — Terrell S Johnson
(74) *Attorney, Agent, or Firm* — HDC IP Law, LLP

(57) ABSTRACT

Various embodiments provide systems and method for hybrid monitoring of individuals using both a combination of a user attached monitor device and a user detached monitor device.

27 Claims, 10 Drawing Sheets

(51) Int. Cl.
  *G08B 21/24*    (2006.01)
  *G08B 25/10*    (2006.01)
  *G01C 21/34*    (2006.01)
  *G01S 5/00*     (2006.01)
  *G06F 1/3212*   (2019.01)
  *G06F 1/3296*   (2019.01)
  *G08B 21/18*    (2006.01)
  *H04W 52/02*    (2009.01)
  *G08B 21/02*    (2006.01)
  *H04W 4/021*    (2018.01)

(56) References Cited

U.S. PATENT DOCUMENTS

| | | | |
|---|---|---|---|
| 6,130,620 A | 10/2000 | Pinnow | |
| 6,169,484 B1 | 1/2001 | Schuman | |
| 6,323,773 B1 | 11/2001 | Runyon | |
| 6,393,362 B1 | 5/2002 | Burns | |
| 7,015,817 B2 | 3/2006 | Copley | |
| 7,619,533 B2 | 11/2009 | Crucilla | |
| 7,886,648 B2 | 2/2011 | Williams | |
| 7,905,832 B1 | 3/2011 | Lau | |
| 7,930,927 B2 | 4/2011 | Cooper | |
| 8,352,111 B2 | 1/2013 | Mudalige | |
| 8,493,219 B2 | 7/2013 | Buck | |
| 8,576,065 B2 | 11/2013 | Buck | |
| 8,629,776 B2 | 1/2014 | Buck | |
| 8,952,805 B2 | 2/2015 | Baines et al. | |
| 9,240,118 B2 | 1/2016 | Melton | |
| 9,355,548 B2 | 5/2016 | Buck | |
| 9,423,487 B2 | 8/2016 | Buck | |
| 9,629,420 B2 | 4/2017 | Cooper | |
| 9,668,095 B1 | 5/2017 | Newell | |
| 9,989,649 B2 | 6/2018 | Buck | |
| 10,068,462 B2 | 9/2018 | Buck | |
| 2003/0222781 A1 | 12/2003 | Defant et al. | |
| 2005/0040944 A1 | 2/2005 | Contestabile | |
| 2007/0014264 A1 | 1/2007 | Davis | |
| 2007/0285258 A1 | 12/2007 | Hartman | |
| 2008/0012760 A1* | 1/2008 | Derrick | H04M 3/42357 342/357.74 |
| 2008/0018459 A1 | 1/2008 | Derrick | |
| 2011/0154887 A1 | 6/2011 | Cooper | |
| 2011/0195722 A1 | 8/2011 | Walter et al. | |
| 2011/0199205 A1 | 8/2011 | Kremi | |
| 2011/0237726 A1 | 9/2011 | Dhuna | |
| 2013/0328678 A1* | 12/2013 | Shechter | G08B 21/22 340/539.13 |
| 2014/0039804 A1 | 2/2014 | Park | |
| 2014/0179342 A1 | 6/2014 | Hamerly | |
| 2015/0123766 A1 | 5/2015 | St. John | |
| 2015/0356261 A1 | 12/2015 | Brust | |
| 2016/0133121 A1* | 5/2016 | Rajala | G08B 21/22 340/506 |
| 2016/0154643 A1 | 6/2016 | Zhang | |
| 2016/0267770 A1 | 9/2016 | Keays | |
| 2016/0301581 A1 | 10/2016 | Carter | |
| 2017/0134249 A1 | 5/2017 | Laing | |
| 2017/0303090 A1 | 10/2017 | Stitt | |
| 2017/0307388 A1 | 10/2017 | McConathy | |
| 2018/0224517 A1 | 8/2018 | Ingerson | |
| 2019/0043285 A1 | 2/2019 | Hodge | |

* cited by examiner

SYSTEMS AND METHODS FOR DEVICE LOAD TRANSFER IN A HYBRID MONITORING SYSTEM

CROSS REFERENCE TO RELATED APPLICATION

The present application claims priority to (i.e., is a non-provisional of) U.S. Pat. App. No. 62/612,650 entitled "Systems and Methods for Monitoring Individuals", and filed Jan. 1, 2018 by Buck et al. The entirety of the aforementioned application is incorporated herein by reference for all purposes.

BACKGROUND OF THE INVENTION

Various embodiments provide systems and method for hybrid monitoring of individuals using both a combination of a user attached monitor device and a user detached monitor device.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward. In many monitoring systems, the lack of sufficient mobile power limits the ability of a monitoring agency to know the movement details of a tracked individual.

Thus, for at least the aforementioned reasons, there exists a need in the art for more advanced approaches, devices and systems for monitoring.

BRIEF SUMMARY OF THE INVENTION

Various embodiments provide systems and method for hybrid monitoring of individuals using both a combination of a user attached monitor device and a user detached monitor device.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
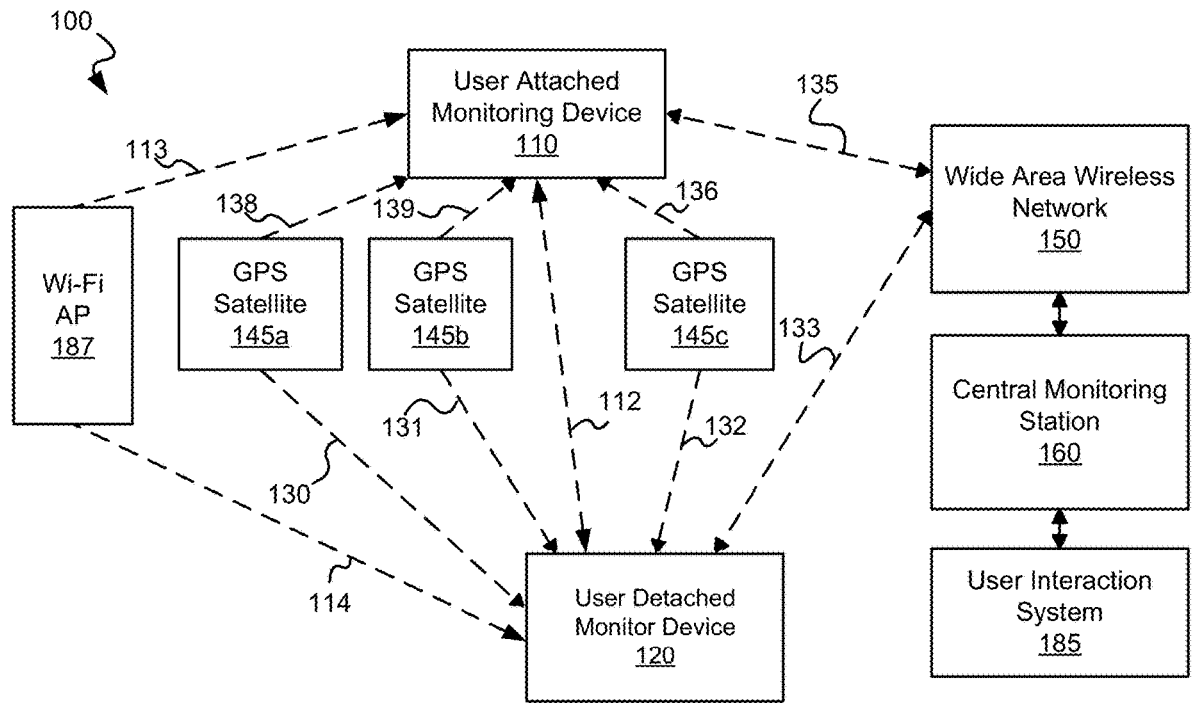
FIG. 1a is a block diagram illustrating a hybrid monitoring system including both a user attached monitor device and a user detached monitor device in accordance with various embodiments.

Various embodiments provide systems and method for hybrid monitoring of individuals using both a combination of a user attached monitor device and a user detached monitor device.

It has been found that returning offenders to society after being locked up in a secure facility with little if any control of their day to day activities is often unsuccessful. It is often helpful to have, for example, a parole officer monitor their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provides tools and devices that continue to support the individual as they transition away from the active oversight by, for example, a parole officer.

Various embodiments provide monitoring systems that include both a user attached monitor and a user detached monitor. The user attached monitor includes: an attachment element configured to attach to a limb of an individual being monitored; a tamper sensor configured to indicate removal of the user attached monitor from the individual being monitored; a first status monitor operable to determine a first status of the individual being monitored; and a first local communication circuit operable to communicate with a second local communication circuit of a user detached monitor. The user detached monitor includes: a second status monitor operable to determine a second status of the individual being monitored; and the second local communication circuit. The second local communication circuit is configured to: communicate with the first local communication circuit of the user attached monitor; and indicate a successful communication with the user attached monitor. The user detached monitor further includes a computer readable medium including instructions executable by a processor to enable a hybrid mode of operation where a portion of operations performed by one of the user detached monitor or the user attached monitor is modified in part because of the indication of a successful communication with the user attached monitor.

In some instances of the aforementioned embodiments, the first status includes one or more of: a location, a motion indication, a tamper indication, and/or a blood alcohol content. In various instances of the aforementioned embodiments, the first status monitor is selected from a group consisting of: a GPS location circuit, a cell tower triangulation location circuit, a Wi-Fi based location circuit, a motion sensor, a tamper sensor, and a biometric sensor. In some instances of the aforementioned embodiments, the second status includes one or more of: a location, a photo, a finger print, and/or an audio recording. In one or more instances of the aforementioned embodiments, the first status monitor is selected from a group consisting of: a GPS location circuit, a temperature sensor circuit, a camera, and a microphone. In certain instances of the aforementioned embodiments, the first local communication circuit and the second local communication circuit are operable to communicate via a protocol selected from a group consisting of: a BlueTooth™ protocol, and a Wi-Fi protocol.

In some instances of the aforementioned embodiments, the portion of operations performed by one of the user detached monitor or the user attached monitor modified in part because of the indication of a successful communication with the user attached monitor is selected from a group consisting of: changing location detection of the individual being monitored from the user attached monitor to the user detached monitor, changing communication to a central control from the user attached monitor to the user detached monitor, changing a check-in from the user attached monitor to the user detached monitor, and changing a check-in from the user detached monitor to the user attached monitor.

Other embodiments provide monitoring systems that include a user detached monitor that is identified as controlled by an individual being monitored. The user detached monitor includes: a status monitor operable to determine a status of the individual being monitored; a local communication circuit configured to: communicate with a user attached monitor that is physically attached to the individual being monitored, and indicate a successful communication with the user attached monitor; and a computer readable medium including instructions executable by a processor to enable a hybrid mode of operation where an operation for which the user attached monitor is configured to perform is performed instead by the user detached monitor.

In some instances of the aforementioned embodiments, the operation for which the user attached monitor is configured to perform is reporting a low battery status of the user attached monitor to a central monitor. In some such instances, the computer readable medium further includes instructions executable by the processor to alert the individual being monitored of the low battery status of the user attached monitor, and wherein the alert is provided to the individual being monitored via a user interface. The user interface includes one or more of: a display of the user detached monitor, a speaker of the user detached monitor, or a vibrator of the user detached monitor. In various instances, reporting the low battery status of the user attached monitor to the central monitor is performed via a cellular telephone network.

In various instances of the aforementioned embodiments, the operation for which the user attached monitor is configured to perform is determining a location of the individual being monitored. In some such instances, the computer readable medium further includes instructions executable by the processor to: enable location updates on the user detached monitor, determine whether the user attached monitor is within communication range of the user detached monitor, and communicate at least a portion of the location updates to a central monitor.

In one or more instances of the aforementioned embodiments, the operation for which the user attached monitor is configured to perform is performing a scheduled check-in. In some such instances, the computer readable medium further includes instructions executable by the processor to: alert the individual being monitored of a check-in requirement, and receive input from the individual being monitored via a user interface of the user detached monitor, and report at least a portion of the input received from the individual being monitored to a central monitor. In some cases, the user interface includes one or more of: a microphone, a touch screen, a camera, a biometric sensor, or a temperature sensor. In various cases, performing the scheduled check-in is requested as an automatic check-in performed by the user attached monitor, and the scheduled check-in is changed to a manual check-in performed by the user detached monitor. In certain cases, the automatic check-in and the manual check-in gather different data about the individual being monitored. in some cases, the automatic check-in and the manual check-in gather the same class of data about the individual being monitored.

Yet other embodiments provide monitoring systems that include a user attached monitor. The user attached monitor includes: an attachment element configured to attach to a limb of an individual being monitored; a tamper sensor configured to indicate removal of the user attached monitor from the individual being monitored; a first local communication circuit operable to communicate with a second local communication circuit of a user detached monitor; and a computer readable medium including instructions executable by a processor to enable a hybrid mode of operation where an operation for which the user detached monitor is configured to perform is performed instead by the user attached monitor. In some instances of the aforementioned embodiments, the operation for which the user detached monitor is configured to perform is performing a scheduled check-in. In some such instances, the computer readable medium further includes instructions executable by the processor to perform the check-in by the user attached monitor, and to report a result of the check-in to a central monitor.

Some embodiments provide methods for extending battery life in a monitoring system. The methods include: providing a user attached monitor and providing a user detached monitor The user attached monitor includes an attachment element configured to attach to a limb of an individual being monitored; a tamper sensor configured to indicate removal of the user attached monitor from the individual being monitored; a first circuitry to perform a first functionality of the user attached monitor device; and a first local communication circuit operable to communicate with a second local communication circuit of a user detached monitor. The user detached monitor includes: a second circuitry operable to perform a second functionality of the user detached monitor device where the second functionality is a proxy of the first functionality, and the second local communication circuit operable to communicate with the first local communication circuit of the user attached monitor. During a first period, the method includes reducing a power consumption of the user attached monitor device by disabling the first circuitry and providing a proxy of the first functionality using the second circuitry of the user detached monitor device. During a second period, the method includes re-enabling the first circuitry and providing the first functionality using the first circuitry of the user attached monitor device. In some instances of the aforementioned embodiments, the methods further include reducing power consumption of the user attached monitor device by disabling the second circuitry and providing a proxy of the second functionality using the first circuitry of the user attached monitor device during the second period.

In various instances of the aforementioned embodiment, the methods further include determining that the user attached monitor device is within a local communication range of the user detached monitor device by establishing communication between the first local communication circuit and the second local communication circuit. In such instances, the reducing the power consumption of the user attached monitor device by disabling the first circuitry and providing the proxy of the first functionality using the second circuitry of the user detached monitor device only occurs when the user detached monitor device and the user attached monitor device are within local communication range.

In one or more instances of the aforementioned embodiments, the second circuitry includes a computer readable medium including instructions executable by a processor to at least in part perform the second functionality. In various instances of the aforementioned embodiments, the first circuitry includes a computer readable medium including instructions executable by a processor to at least in part perform the first functionality. The first functionality may be, but is not limited to, a location determination functionality; an alcohol detection functionality; a wide area network communication functionality; a combination of the location determination functionality and the alcohol detection functionality; a combination of the location determination functionality and the wide area network communication functionality; a combination of the location determination functionality, the alcohol detection functionality, and the wide area network communication functionality; or a combination of the alcohol detection functionality and the wide area network communication functionality.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a BlueTooth™ communication link. In other examples, local communication link 112 may be a line of sight infared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wide area wireless (e.g., cellular telephone network, Internet via a Wi-Fi access point, or the like) communication networks 150.

User detached monitor device 120 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145a, 145b, 145c via respective communication links 130, 131, 132. The aforementioned location data is utilized verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 114.

Central monitoring station 160 preferably comprises a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS satellites 145a, 145b, 145c via respective communication links 136, 138, 139. The aforementioned location data is utilized to verify the location of a user associated with user attached monitor device 110 at various points as more fully discussed below. User attached monitor device 110 is considered "non-ambiguous" because it is physically attached to the user in a tamper resistant way and as such provides information only about the user to which it is attached.

The location data and/or other data gathered by user attached monitor device 110 is wirelessly transmitted to central monitoring station 160 via a wide area wireless network 150 accessed via a wireless link 135. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
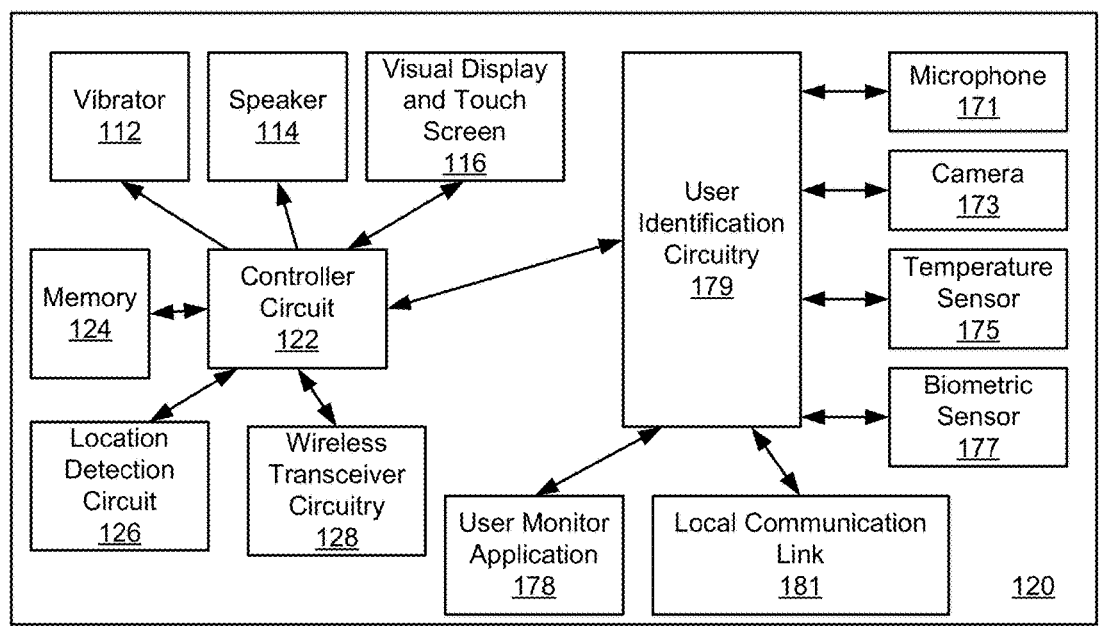
FIG. 1b is a block diagram of a user detached monitor device usable in accordance with one or more embodiments.

Turning to FIG. 1b, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software of firmware based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128.

User detached monitor device 120 additionally includes location circuitry 126. Location circuitry 126 may include one or more of, a GPS processing circuit capable of fixing a location of user detached monitor device 120 using GPS data, an cell tower triangulation processing circuit capable of fixing a location of user detached monitor device 120 using cell tower triangulation data, and/or a cell tower triangulation circuit capable of fixing a location of user detached monitor device 120 using cell tower triangulation data. A local communication link 181 controls communication between user detached monitor device 120 and user attached monitor device 110. In some embodiments, local communication link 181 supports a BlueTooth™ communication protocol and is capable of both receiving information from user attached monitor device 110 and transmitting information to user attached monitor device 110. In other embodiments, Local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

Figure 1C:
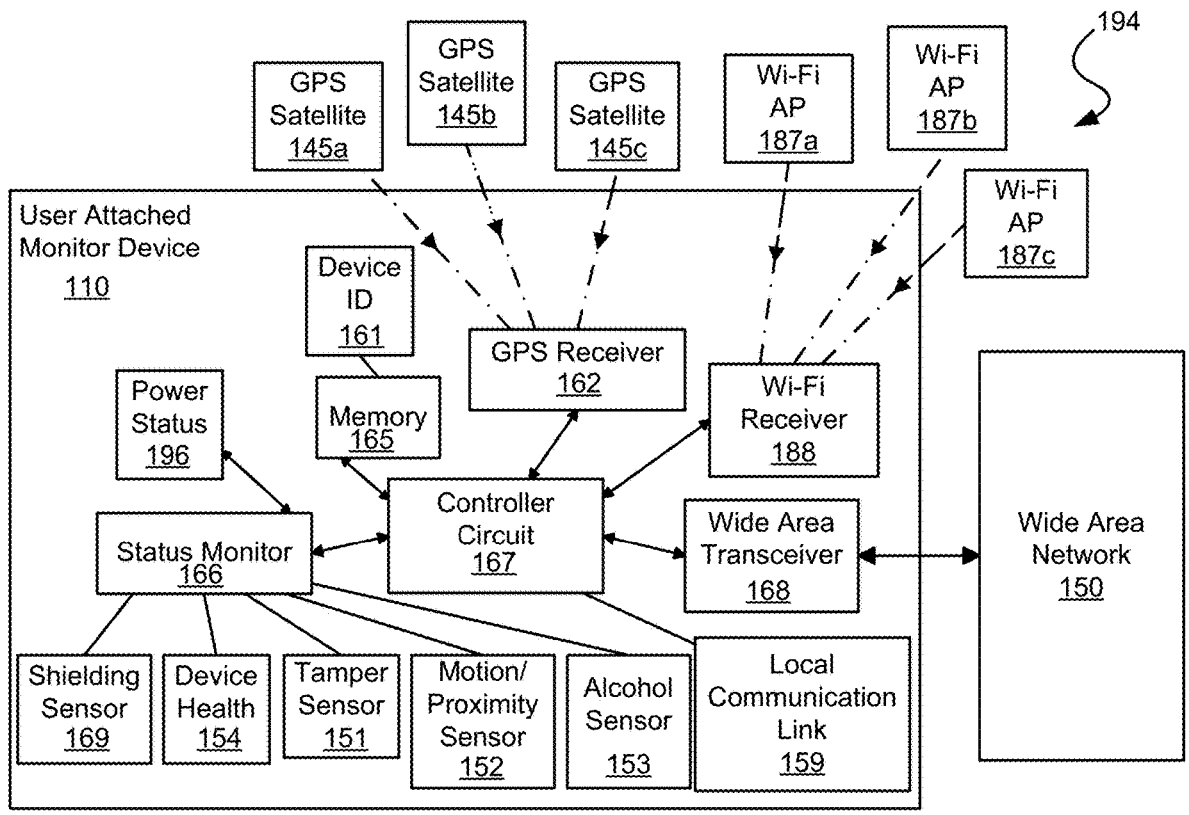
FIG. 1c is a block diagram of a user attached monitor device including a local communication link in accordance with some embodiments.

Turning to FIG. 1c, a block diagram 194 of user attached monitor device 110 including a local communication link 159 in accordance with some embodiments. Local communication link 159 controls communication between user attached monitor device 110 and user detached monitor device 120. In some embodiments, local communication link 159 supports a BlueTooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 110 and transmitting information to user detached monitor device 110. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and thus is accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware based instructions) executable by controller circuit 167 to perform and/or enable various functions associated with user attached monitor device 110. As user attached monitor device 110 comes within range of one or more Wi-Fi access points (e.g., Wi-Fi access points 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a cellular transceiver 168 and wide area communication network 150 in accordance with a first time period. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from a central monitor system (not shown), or based upon scenarios. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third party service provider resolve the location information. When a maximum number of resolution requests have been issued, the Wi-Fi position determination technology may be disabled. Further, it may be determined the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as AFLT, GPS, or cell tower triangulation may be used.

Controller circuit 167 of user attached monitor device 110 at times functions in conjunction with cellular transceiver 168 to send and receive data and signals through cellular network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via cellular network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
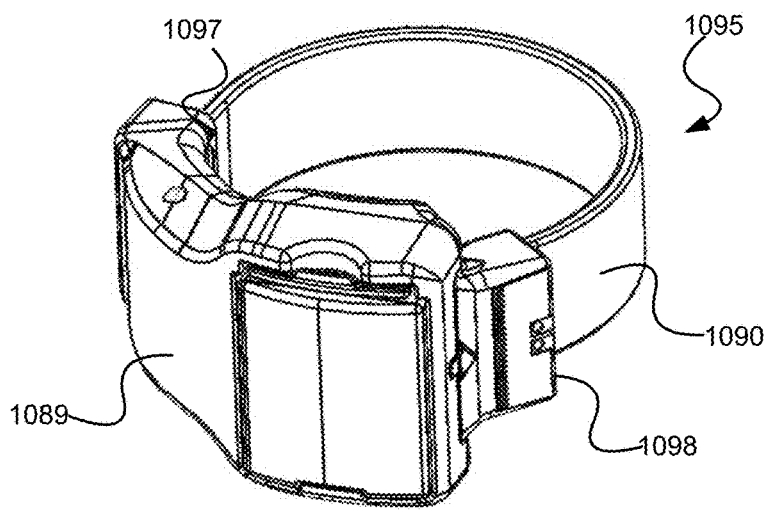
FIG. 1d shows a user attached monitor device with an attachment element for attaching the user attached monitor device to a limb of an individual in accordance with some embodiments.

Turning to FIG. 1d, a user attached monitor device 1089 is shown with an example attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments. In various embodiments, attachment element 1090 includes electrically and/or optically conductive material used to make a conductive connection form first end 1097 to second end 1098 through attachment element 1090 and is used in relation to determining whether user attached monitor device 1089 remains attached and/or has been tampered with. While FIG. 1d shows a strap as an example attachment element, based upon the disclosure provided herein, one of ordinary skill in the art will recognize other types of attachment elements that may be used in relation to different embodiments.

Figure 2:
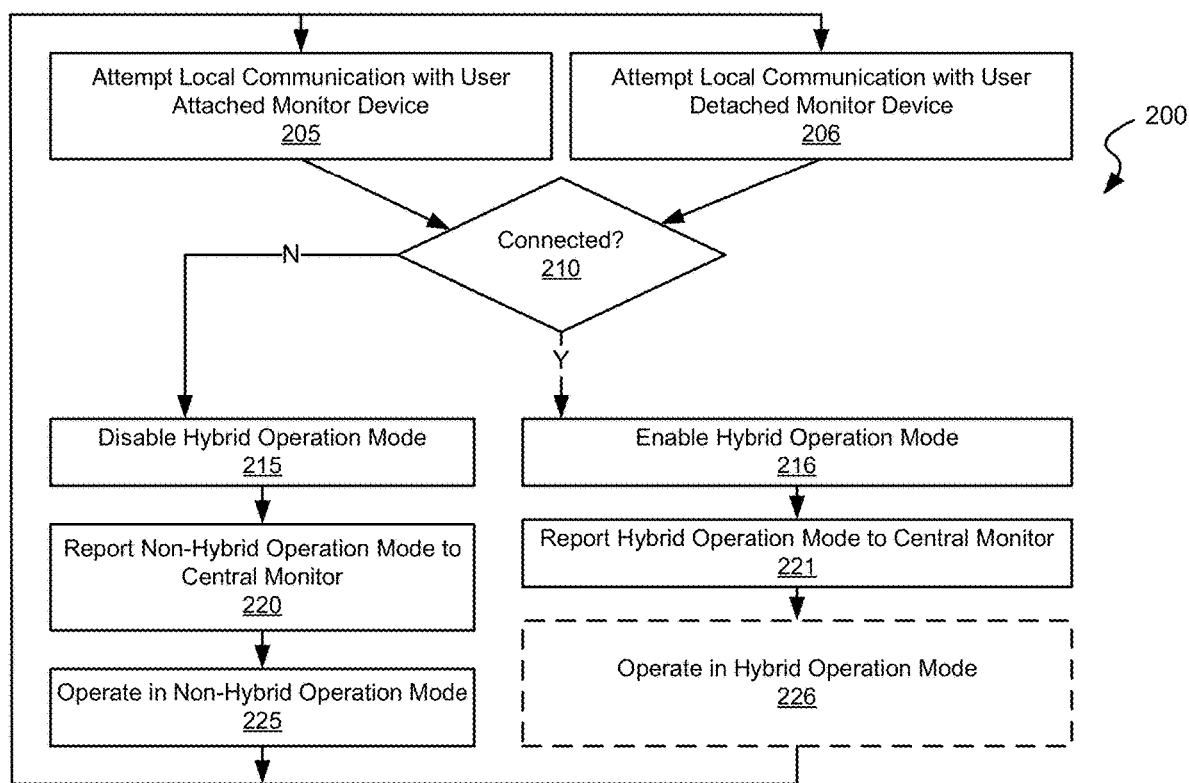
FIG. 2 is a flow diagram showing a method for connecting a user detached monitoring device and a user attached monitoring device using a local communication link, and for changing a mode of operation of a monitoring system based upon the connection in accordance with various embodiments.

Turning to FIG. 2, a flow diagram 200 shows a method for connecting a user detached monitoring device and a user attached monitoring device using a local communication link, and for changing a mode of operation of a monitoring system based upon the connection in accordance with various embodiments. The mode of operation is changed between a non-hybrid operation mode where monitoring is performed exclusively by only one of the user detached monitor device or the user attached monitor device. In certain embodiments, when a connection between a user attached monitor device and a user detached monitor device is not possible, monitoring of an individual is performed exclusively by the user attached monitor device.

Following flow diagram 200, local communication is attempted by the user detached monitor device to the user attached monitor device (block 205). The communication attempt can be sent by one or both of the user attached monitoring device and/or the user detached monitoring device. In some cases, the communication is always attempted by the user detached monitor device to the user attached monitor device (block 205). In such cases, the aforementioned local communication link 181 of the user detached monitor device is used to send a connection request to local communication link 159 of the user attached monitor device. Where the request is accepted by the user attached monitor device, the devices are connected. In some cases, the connection request is a BlueTooth™ communication protocol request. In other cases, the connection request is a Wi-Fi communication protocol request. Based upon the disclosure provided herein, one of ordinary skill in the art will recognize a variety of communication protocol requests that may be used to support relatively short distance communication (i.e., less than one hundred (100) feet) in relation to different embodiments.

In other cases, the communication is always attempted by the user attached monitoring device to the user detached monitor device (block 206). In such cases, the aforementioned local communication link 159 of the user attached monitor device is used to send a connection request to the local communication link 181 of the user detached monitor device. Where the request is accepted by the user detached monitor device, the devices are connected. In certain cases, the communication is attempted by both the user attached monitoring device to the user detached monitor device, and the user detached monitoring device to the user attached monitor device in parallel (block 206). Where either the connection request from the user detached monitor device to the user attached monitor device or the connection request from the user attached monitor device to the user detached monitor device is accepted by the recipient device, the user attached monitor device and the user detached monitor device are considered connected (block 210).

Where the user detached monitor device and the user attached monitor device are considered attached (block 210), hybrid mode operation is enabled (block 216) and the hybrid mode of operation is reported to the central monitor by one or both of the user detached monitor device and/or the user attached monitor device (block 221). Hybrid mode operation allows for use of functionality from a combination of the user attached monitor device and the user detached monitor device (block 226). Such operation in the hybrid mode is shown in dashed lines as there are a large number of combinations of the functionality of the user detached monitor device and the user attached monitor device that may be used in relation to different embodiments. For example, as discussed in more detail below in relation to FIG. 3, where it is determined that the battery in the user attached monitor device is identified the cellular transmitter in the user attached monitor device may be shut down and all cellular communications handled via the user detached monitor device. This may be done, for example, by transferring reporting data from the user attached monitor device to the user detached monitor device (using a combination of local communication link 159 and local communication link 181), and the information transferred to the user detached monitor device is uploaded to a central monitor using the cellular transceiver of the user detached monitor device. Based upon the disclosure provided herein, one of ordinary skill in the art will recognize a variety of combinations of the functionality of the user detached monitor device and the user attached monitor device that may be used in relation to different embodiments.

Alternatively, where the user detached monitor device and the user attached monitor device are not considered attached (block 210), the hybrid mode of operation is disabled (block 215) and the non-hybrid mode of operation is reported to the central monitor by one or the other of the user detached monitor device or the user attached monitor device that attempted to connect to the other but failed to establish a connection (block 220). Non-hybrid mode operation causes both the user attached monitor device and the user detached monitor device to operate as if they are the only monitoring device in operation (block 225).

Figure 3:
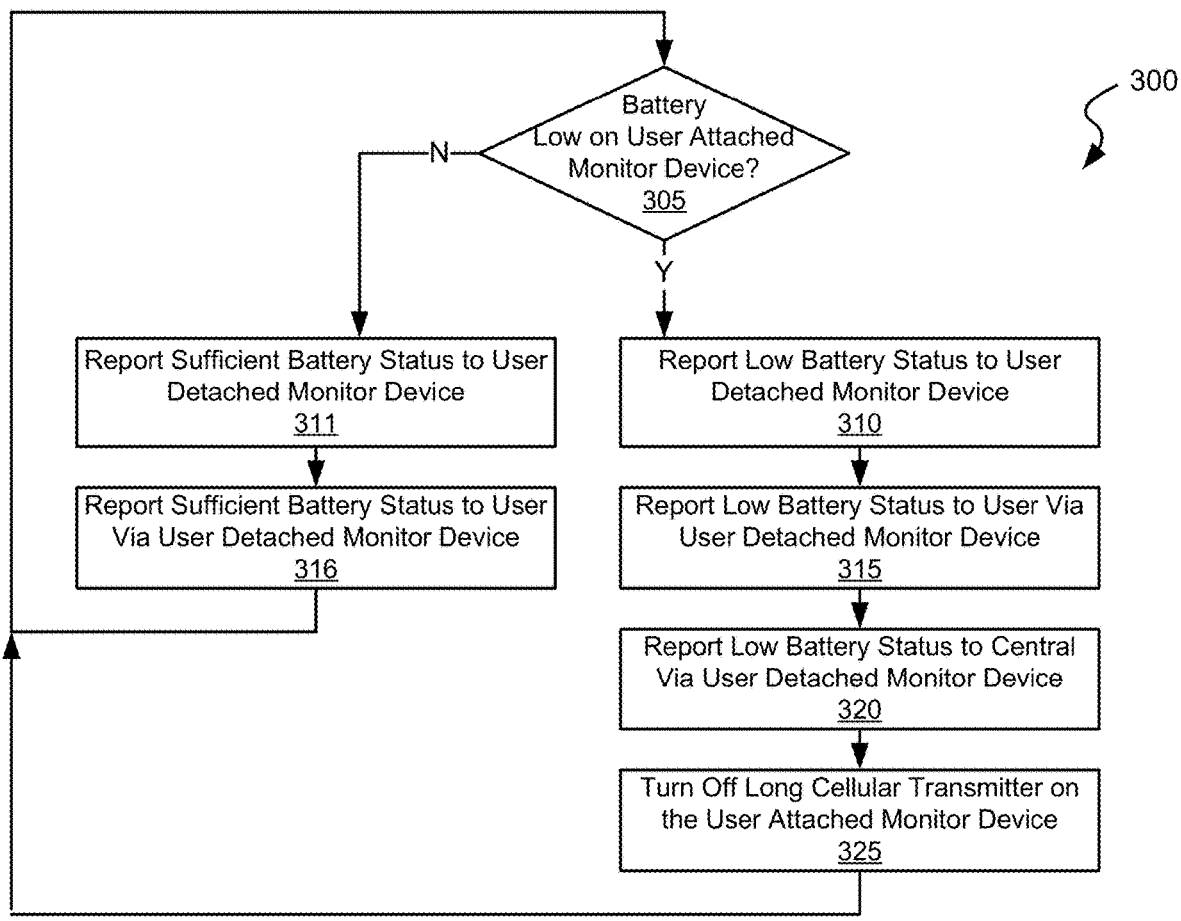
FIG. 3 is a flow diagram showing a method for using a user detached monitoring device to report battery status of a user attached monitoring device and change a mode of operation of a monitoring system in accordance with one or more embodiments.

Turning to FIG. 3, a flow diagram 300 shows a method for operating in a hybrid mode of operation (one example of processes performed in block 226 discussed above) that includes using a user detached monitoring device to report battery status of a user attached monitoring device and to change a mode of operation of a monitoring system in accordance with one or more embodiments. Following flow diagram 300, a status monitor on the user attached monitor device determines whether a low battery condition exists (block 305). A low battery condition may be, for example, a condition where less than twenty percent of a full charge remains on the battery of the user attached monitor device. Based upon the disclosure provided herein, one of ordinary skill in the art will recognize a variety of conditions that may be considered a low battery condition for different embodiments.

Where a low battery condition is determined by the user attached monitor device (block 305), the low battery condition is reported by the user attached monitor device to the user detached monitor device (block 310). This information is communicated via a message sent via the local communication link 159 of the user attached monitor device to the local communication link 181 of the user detached monitor device. The message is sent using any protocol supported between the local communication link 159 and the local communication link 181. In some embodiments, the message includes only a header indicating the message type (i.e., low battery) that implies the low battery condition. In other embodiments, the message includes a header indicating the message type (i.e., low battery) followed by detailed battery information in a data packet following the header. Based upon the disclosure provided herein, one of ordinary skill in the art will recognize a variety of messages and/or message protocols that may be used in relation to different embodiments to indicate low battery status from the user attached monitor device to the user detached monitor device.

The user detached monitor device reports the low battery status to the individual being monitored (i.e., the individual associated with the user detached monitor device) (block 315). This reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device reports the low battery status to a central monitor (block 320). In some embodiments, reporting of the low battery status to the central monitor is done via a cellular telephone network via the wireless transceiver circuitry 128 of the user detached monitor device. Alternatively, reporting of the low battery status to the central monitor is done via the Internet using a Wi-Fi hotspot via the wireless transceiver circuitry 128 of the user detached monitor device.

The attached monitor device disables the cellular transmission capability (e.g., the cellular transceiver 168) (block 325). By transmitting the low battery condition to the central monitor via the user detached monitor device and turning off the cellular communication capability of the user detached monitor device, the battery of the user attached monitor device is preserved.

Alternatively, where a low battery condition is not reported by the user attached monitor device to the user detached monitor device (block 305), the user detached monitor device periodically reports sufficient battery to the individual being monitored (i.e., the individual associated with the user detached monitor device) (block 311). Similar to that described above, this reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device periodically reports sufficient battery to the individual being monitored (i.e., the individual associated with the user detached monitor device) via the user detached monitor device (block 316). Similar to that described above, this reporting may be done, for example, by displaying a message indicating the sufficient battery condition via the visual display and touch screen 116 of the user detached monitor device. As another example, the message indicating the sufficient battery condition may be delivered as an audio alert via the speaker 114 of the user detached monitor device. Based upon the disclosure provided herein, one of ordinary skill in the art will recognize a variety of methods and/or mechanisms for alerting an individual being monitored of a sufficient battery condition of the user attached monitor device.

Figure 4:
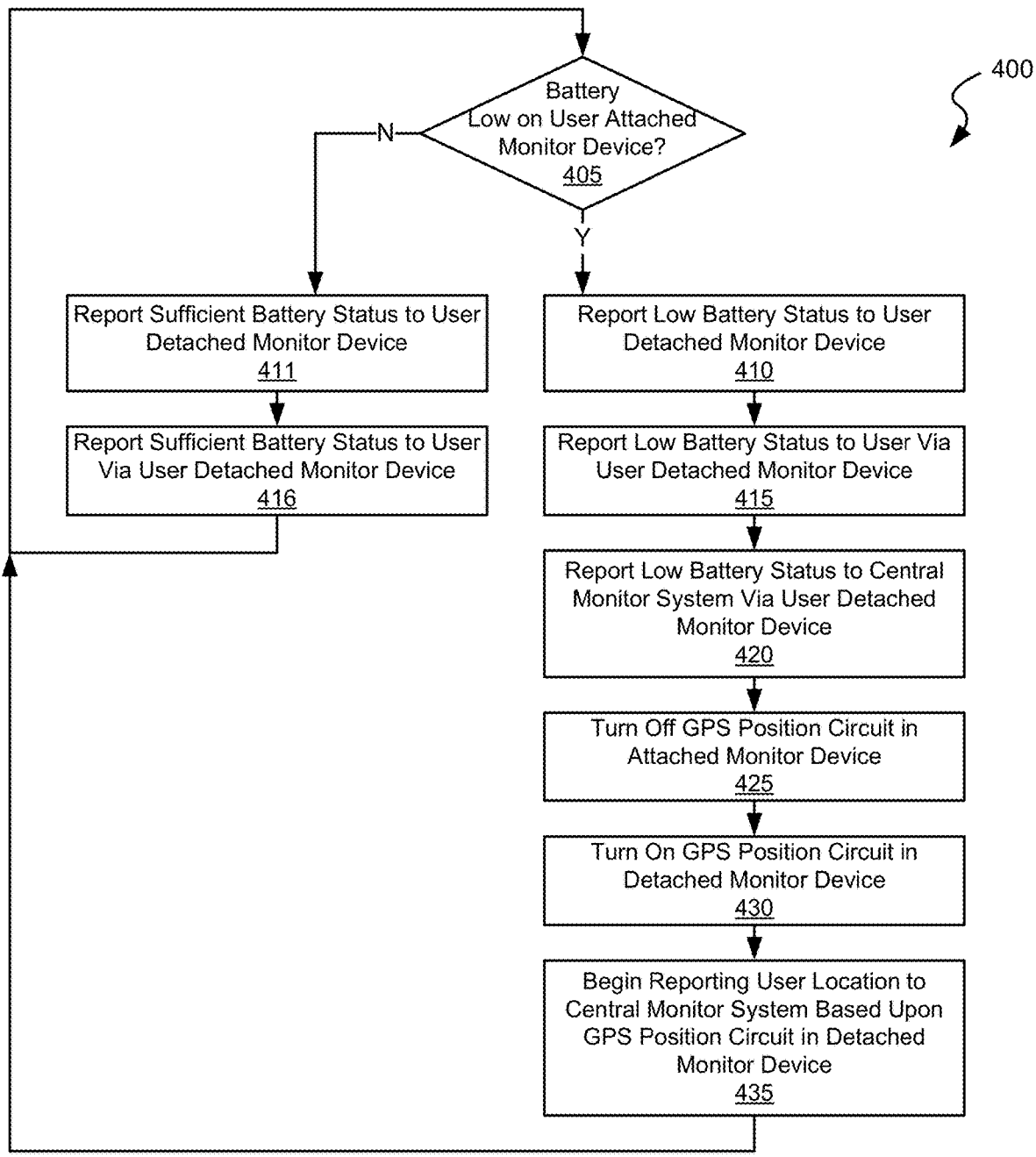
FIG. 4 is a flow diagram showing a method for switching from user attached monitoring device location coordinates to user detached monitoring device location coordinates in accordance with some embodiments.

Turning to FIG. 4, a flow diagram 400 shows a method for operating in a hybrid mode of operation (another example of processes performed in block 226 discussed above) that includes using location coordinates from the user detached monitor device in place of user coordinates from the user attached monitor in accordance with various embodiments. Following flow diagram 400, a status monitor on the user attached monitor device determines whether a low battery condition exists (block 405). A low battery condition may be, for example, a condition where less than twenty percent of a full charge remains on the battery of the user attached monitor device. Based upon the disclosure provided herein, one of ordinary skill in the art will recognize a variety of conditions that may be considered a low battery condition for different embodiments.

Where a low battery condition is determined by the user attached monitor device (block 405), the low battery condition is reported by the user attached monitor device to the user detached monitor device (block 410). This information is communicated via a message sent via the local communication link 159 of the user attached monitor device to the local communication link 181 of the user detached monitor device. The message is sent using any protocol supported between the local communication link 159 and the local communication link 181. In some embodiments, the message includes only a header indicating the message type (i.e., low battery) that implies the low battery condition. In other embodiments, the message includes a header indicating the message type (i.e., low battery) followed by detailed battery information in a data packet following the header. Based upon the disclosure provided herein, one of ordinary skill in the art will recognize a variety of messages and/or message protocols that may be used in relation to different embodiments to indicate low battery status from the user attached monitor device to the user detached monitor device.

The user detached monitor device reports the low battery status to the individual being monitored (i.e., the individual associated with the user detached monitor device) (block 415). This reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device reports the low battery status to a central monitor (block 420). In some embodiments, reporting of the low battery status to the central monitor is done via a cellular telephone network via the wireless transceiver circuitry 128 of the user detached monitor device. Alternatively, reporting of the low battery status to the central monitor is done via the Internet using a Wi-Fi hotspot via the wireless transceiver circuitry 128 of the user detached monitor device.

The attached monitor device disables GPS location determination functionality (e.g., the GPS receiver 162) (block 425). In some cases, any Wi-Fi based location functionality is also disabled. By turning off the GPS location determination functionality and/or other location determination functionality in the user attached monitor device, the battery of the user attached monitor device is preserved.

The user detached monitor device turns on GPS location functionality in the user detached monitor device (e.g., the location detection circuit 126) (block 430). In some cases, any Wi-Fi based location functionality is also turned on—either in addition to GPS location functionality or in place of GPS location functionality. By turning off the location determination functionality of the user attached monitor device and turning on the location determination functionality of the user detached monitor device, power is effectively being shared from the user detached monitor device to the user attached monitor device.

Location status expected by the central monitor is serviced by the user detached monitor device instead of the user attached monitor device (block 435). While such location information from the user detached monitor device may be considered less reliable than that from the user attached monitor device because the user detached monitor device is not physically attached to the individual being monitored, a periodic connection request from the user detached monitor device to the user attached monitor device can be used to verify that the user detached monitor device is within a define range (i.e., a range supported between the local communication link 181 of the user detached monitor device and the local communication link 159 of the user attached monitor device. By knowing that the user detached monitor device is within a communication range of the user attached monitor device, the reliability of location information derived from the user detached monitor device can be made more reliable.

Alternatively, where a low battery condition is not reported by the user attached monitor device to the user detached monitor device (block 405), the user detached monitor device periodically reports sufficient battery to the individual being monitored (i.e., the individual associated with the user detached monitor device) (block 411). Similar to that described above, this reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device periodically reports sufficient battery to the individual being monitored (i.e., the individual associated with the user detached monitor device) via the user detached monitor device (block 416). Similar to that described above, this reporting may be done, for example, by displaying a message indicating the sufficient battery condition via the visual display and touch screen 116 of the user detached monitor device. As another example, the message indicating the sufficient battery condition may be delivered as an audio alert via the speaker 114 of the user detached monitor device. Based upon the disclosure provided herein, one of ordinary skill in the art will recognize a variety of methods and/or mechanisms for alerting an individual being monitored of a sufficient battery condition of the user attached monitor device.

Figure 5:
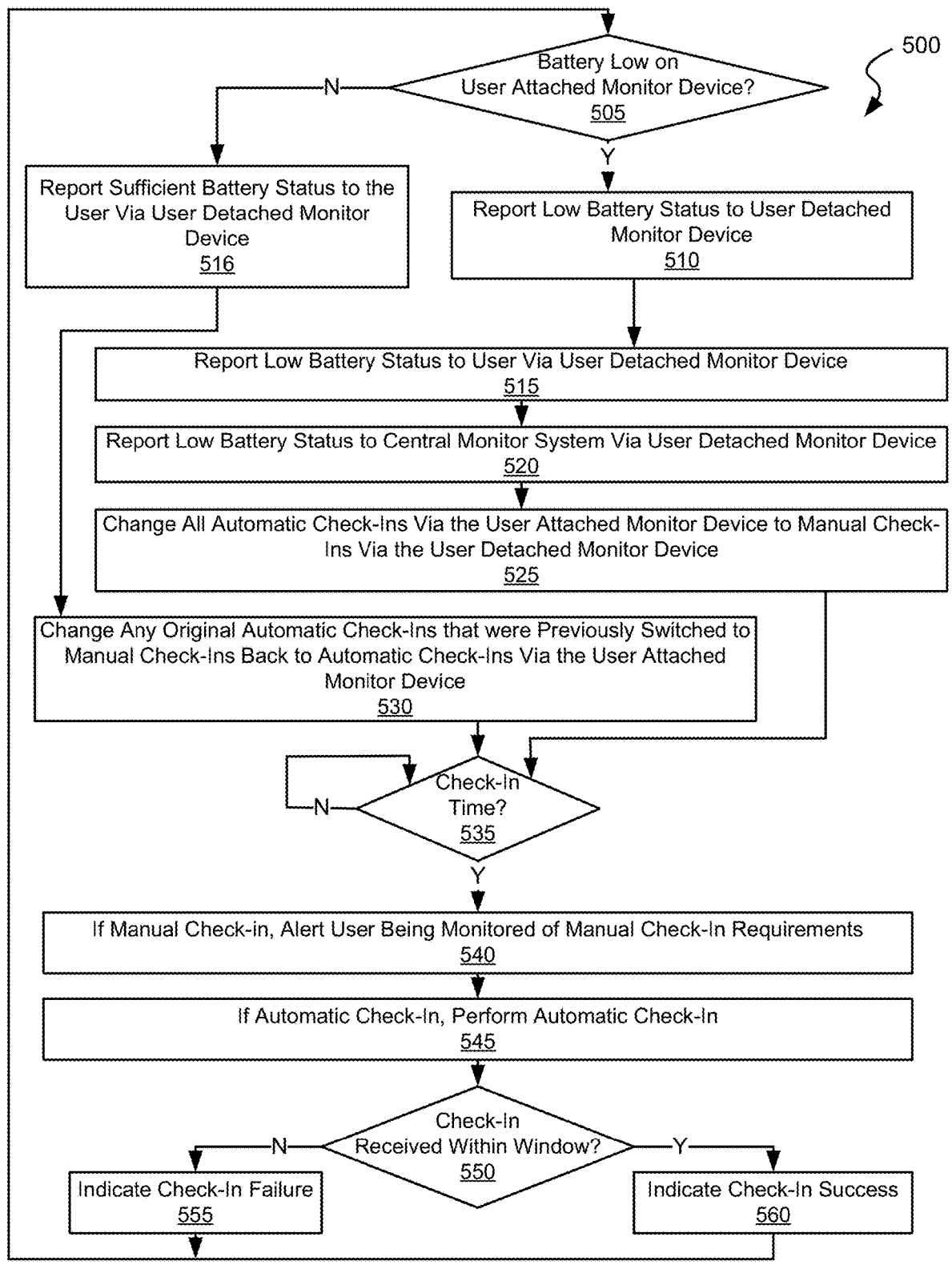
FIG. 5 is a flow diagram showing a method for switching from automatic check-ins performed via a user attached monitoring device to manual check-ins performed via a user detached monitoring device accordance with various embodiments.

Turning to FIG. 5, a flow diagram 500 shows a method for operating in a hybrid mode of operation (one example of processes performed in block 226 discussed above) that includes switching from automatic check-ins performed via the user attached monitoring device to manual check-ins performed via a user detached monitoring device accordance with various embodiments. Following flow diagram 500, a status monitor on the user attached monitor device determines whether a low battery condition exists (block 505). A low battery condition may be, for example, a condition where less than twenty percent of a full charge remains on the battery of the user attached monitor device. Based upon the disclosure provided herein, one of ordinary skill in the art will recognize a variety of conditions that may be considered a low battery condition for different embodiments.

Where a low battery condition is determined by the user attached monitor device (block 505), the low battery condition is reported by the user attached monitor device to the user detached monitor device (block 510). This information is communicated via a message sent via the local communication link 159 of the user attached monitor device to the local communication link 181 of the user detached monitor device. The message is sent using any protocol supported between the local communication link 159 and the local communication link 181. In some embodiments, the message includes only a header indicating the message type (i.e., low battery) that implies the low battery condition. In other embodiments, the message includes a header indicating the message type (i.e., low battery) followed by detailed battery information in a data packet following the header. Based upon the disclosure provided herein, one of ordinary skill in the art will recognize a variety of messages and/or message protocols that may be used in relation to different embodiments to indicate low battery status from the user attached monitor device to the user detached monitor device.

The user detached monitor device reports the low battery status to the individual being monitored (i.e., the individual associated with the user detached monitor device) (block 515). This reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user detached monitor device reports the low battery status to a central monitor (block 520). In some embodiments, reporting of the low battery status to the central monitor is done via a cellular telephone network via the wireless transceiver circuitry 128 of the user detached monitor device. Alternatively, reporting of the low battery status to the central monitor is done via the Internet using a Wi-Fi hotspot via the wireless transceiver circuitry 128 of the user detached monitor device.

Check-Ins that were originally scheduled to be performed automatically by the user attached monitor device are changed to manual check-ins to be performed using the user detached monitor device (block 525). Such "check-ins" are scheduled uploads of data from one or both of the user attached monitor device and/or the user detached monitor device. The user attached monitor device performs automatic check-ins. As used herein the phrase "automatic check-in" is used in its broadest sense to mean any process of providing status information according to a schedule without active involvement by the individual being monitored. Such an automatic check-in may include, but is not limited to, the user attached monitor device uploading location and device tamper status to a central monitor within a reporting window. In contrast, the phrase "manual check-in" includes all other processes of providing status information. For example, a manual check-in may include requesting information from an individual that requires a response. Such a manual check-in may include, but is not limited to, requesting a fingerprint from the user via a touch screen of the user detached monitor device. Other features and processes included with check-ins are discussed in relation to U.S. patent application Ser. No. 16/221,493, entitled "Systems and Methods for Semi-Autonomous Individual Monitoring" and filed on a date even herewith by Buck et al. The entirety of the aforementioned reference is incorporated herein by reference for all purposes.

Alternatively, where a low battery condition is not reported by the user attached monitor device to the user detached monitor device (block 505), the user detached monitor device periodically reports sufficient battery to the individual being monitored (i.e., the individual associated with the user detached monitor device) via the user detached monitor device (block 516). Similar to that described above, this reporting may be done, for example, by displaying a message indicating the sufficient battery condition via the visual display and touch screen 116 of the user detached monitor device. As another example, the message indicating the sufficient battery condition may be delivered as an audio alert via the speaker 114 of the user detached monitor device. Based upon the disclosure provided herein, one of ordinary skill in the art will recognize a variety of methods and/or mechanisms for alerting an individual being monitored of a sufficient battery condition of the user attached monitor device.

Where there is sufficient battery in the attached user monitor device (block 505), all check-ins are performed in accordance with the original schedule of check-ins (i.e., a schedule of check-ins not modified by changing automatic check-ins to manual check-ins as done in block 525) (block 530). As more fully discussed in the previously incorporated reference entitled "Systems and Methods for Semi-Autonomous Individual Monitoring", a check-in schedule can be created that includes one or more check-in times along with one or more requirements for the check-ins (e.g., manual or automatic check-in).

It is determined whether the check-in schedule indicates it is time to perform a check-in (block 535). Where it is determined that a check-in is due (block 535), an individual being monitored is notified of the check-in requirements if the check-in to be performed is a manual check-in (block 540). This alert to the individual being monitored may be performed similar to that disclosed in the previously incorporated reference entitled "Systems and Methods for Semi-Autonomous Individual Monitoring". The individual then checks-in in accordance with the check in requirements. Where, on the other hand, the check-in is to be performed automatically, the automatic check-in is performed (block 545).

It is determined whether the required check-in information was received from the user detached monitoring device within the expected window of time (block 550). If the required information is not received (block 550), a check-in failure is indicated (block 555). When such a check-in failure is indicated, a message is sent from the user detached monitoring device to the central monitoring station that includes recent location information for the user detached monitoring device and an indication of the check-in failure.

Alternatively, if the required information is received (block 550), a check-in success is indicated (block 560). When such a check-in success is indicated, a message is sent from the user detached monitoring device to the central monitoring station that includes recent location information for the user detached monitoring device and the gathered user identification information (i.e., a subset of the required check-in information).

Figure 6:
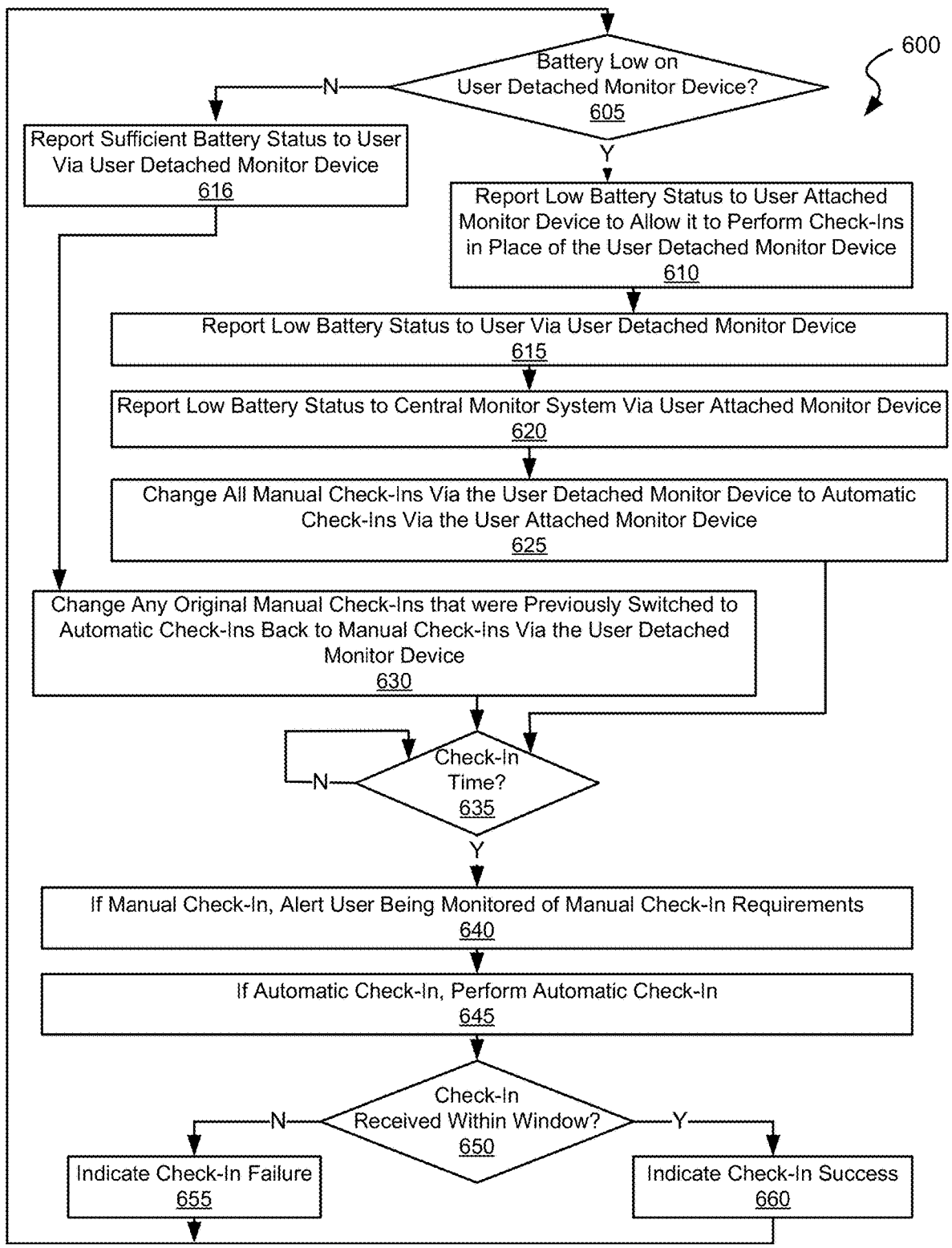
FIG. 6 is a flow diagram showing a method for switching from manual check-ins performed via a user detached monitoring device to automatic check-ins performed via a user attached monitoring device accordance with some embodiments.

Turning to FIG. 6, a flow diagram 600 shows a method for operating in a hybrid mode of operation (one example of processes performed in block 226 discussed above) that includes switching from manual check-ins performed via a user detached monitoring device to automatic check-ins performed via a user attached monitoring device accordance with some embodiments. Following flow diagram 600, a status monitor on the user detached monitor device determines whether a low battery condition exists (block 605). A low battery condition may be, for example, a condition where less than twenty percent of a full charge remains on the battery of the user detached monitor device. Based upon the disclosure provided herein, one of ordinary skill in the art will recognize a variety of conditions that may be considered a low battery condition for different embodiments.

Where a low battery condition is determined by the user detached monitor device (block 605), the low battery condition is reported by the user detached monitor device to the user attached monitor device (block 610). Providing this low battery information allows the user attached monitor device to perform automatic check-ins where an original check-in schedule indicated a manual check-in. This low battery information is communicated via a message sent via the local communication link 181 of the user detached monitor device to the local communication link 159 of the user attached monitor device. The message is sent using any protocol supported between the local communication link 159 and the local communication link 181. In some embodiments, the message includes only a header indicating the message type (i.e., low battery) that implies the low battery condition. In other embodiments, the message includes a header indicating the message type (i.e., low battery) followed by detailed battery information in a data packet following the header. Based upon the disclosure provided herein, one of ordinary skill in the art will recognize a variety of messages and/or message protocols that may be used in relation to different embodiments to indicate low battery status from the user attached monitor device to the user detached monitor device.

The user detached monitor device reports the low battery status to the individual being monitored (i.e., the individual associated with the user detached monitor device) (block 615). This reporting may be done, for example, by displaying a message indicating the low battery condition via the visual display and touch screen 116 of the user detached monitor device. As another example, the message indicating the low battery condition may be delivered as an audio alert via the speaker 114 of the user detached monitor device. Based upon the disclosure provided herein, one of ordinary skill in the art will recognize a variety of methods and/or mechanisms for alerting an individual being monitored of a low battery condition of the user attached monitor device. Providing such a low battery message to the individual being monitored allows for providing both an opportunity and a responsibility for maintaining the battery of the user attached monitor device.

The user attached monitor device reports the low battery status to a central monitor (block 620). In some embodiments, reporting of the low battery status to the central monitor is done via a cellular telephone network via cellular transceiver 168 of the user attached monitor device. Alternatively, reporting of the low battery status to the central monitor is done via the Internet using a Wi-Fi hotspot via the Wi-Fi transceiver 188 of the user attached monitor device.

Check-Ins that were originally scheduled to be performed manually by the user detached monitor device are changed to automatic check-ins to be performed using the user attached monitor device (block 625). Again, such check-ins are scheduled uploads of data from one or both of the user attached monitor device and/or the user detached monitor device. The user attached monitor device performs automatic check-ins.

Alternatively, where a low battery condition is not reported by the user detached monitor device to the user attached monitor device (block 605), the user detached monitor device periodically reports sufficient battery to the individual being monitored (i.e., the individual associated with the user detached monitor device) (block 616). Similar to that described above, this reporting may be done, for example, by displaying a message indicating the sufficient battery condition via the visual display and touch screen 116 of the user detached monitor device. As another example, the message indicating the sufficient battery condition may be delivered as an audio alert via the speaker 114 of the user detached monitor device. Based upon the disclosure provided herein, one of ordinary skill in the art will recognize a variety of methods and/or mechanisms for alerting an individual being monitored of a sufficient battery condition of the user detached monitor device.

Where there is sufficient battery in the attached user monitor device (block 605), all check-ins are performed in accordance with the original schedule of check-ins (i.e., a schedule of check-ins not modified by changing manual check-ins to automatic check-ins as done in block 625) (block 630). As more fully discussed in the previously incorporated reference entitled "Systems and Methods for Semi-Autonomous Individual Monitoring", a check-in schedule can be created that includes one or more check-in times along with one or more requirements for the check-ins (e.g., manual or automatic check-in).

It is determined whether the check-in schedule indicates it is time to perform a check-in (block 635). Where it is determined that a check-in is due (block 635), an individual being monitored is notified of the check-in requirements if the check-in to be performed is a manual check-in (block 640). This alert to the individual being monitored may be performed similar to that disclosed in the previously incorporated reference entitled "Systems and Methods for Semi-Autonomous Individual Monitoring". The individual then checks-in in accordance with the check in requirements. Where, on the other hand, the check-in is to be performed automatically, the automatic check-in is performed (block 645).

It is determined whether the required check-in information was received from the user detached monitoring device within the expected window of time (block 650). If the required information is not received (block 650), a check-in failure is indicated (block 655). When such a check-in failure is indicated, a message is sent from the user detached monitoring device to the central monitoring station that includes recent location information for the user detached monitoring device and an indication of the check-in failure. Alternatively, if the required information is received (block 650), a check-in success is indicated (block 660). When such a check-in success is indicated, a message is sent from the user detached monitoring device to the central monitoring station that includes recent location information for the user detached monitoring device and the gathered user identification information (i.e., a subset of the required check-in information).

Figure 7:
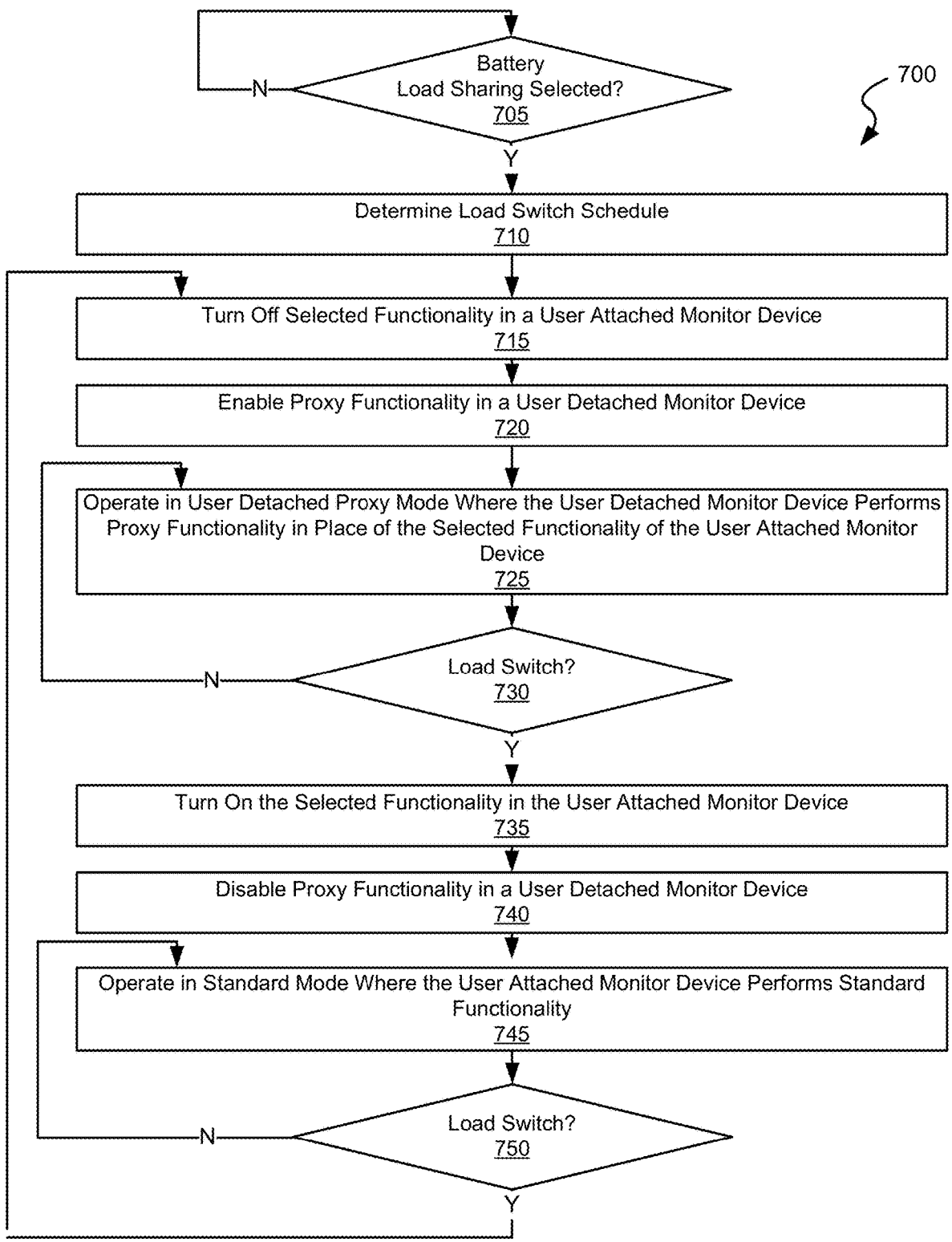
FIG. 7 is a flow diagram showing a method for battery load sharing between a user attached monitor device and a user detached monitor device in accordance with various embodiments.

Turning to FIG. 7, a flow diagram 700 showing a method for battery load sharing between a user attached monitor device and a user detached monitor device in accordance with various embodiments. Following flow diagram 700, it is determined whether battery load sharing is desired when hybrid mode is operational (block 705). Hybrid operational mode is selected using a process similar to that discussed above in relation to FIG. 2. This determination may be made by one or both of the user detached monitor device and/or the user attached monitor device. In some embodiments, a monitoring person setting up the user detached monitor device and/or the user attached monitor device may select a setting indicating that where possible (e.g., where hybrid mode is enabled) battery load sharing should be used. Alternatively, or in addition, a setting change may be performed remotely by downloading an update to one or both of the user detached monitor device and/or the user attached monitor device. Thus, as an example, a request to perform battery load sharing may be downloaded from central monitoring station 160 to one or both of user detached monitor device 120 and/or user attached monitor device 110.

Where battery load sharing is selected (block 705), a load switch schedule is determined (block 710). In this embodiment, the load switch schedule indicates: a first time period during which functionality of a user attached monitor device is disabled to save power, while proxy functionality in a user detached monitor device is enabled to provide similar results to that achievable using an enabled user attached monitor device; and a second time period during which functionality of a user attached monitor device is re-enabled to allow the user attached monitor device to perform its functionality. Without a change in status (i.e., hybrid mode of operation and battery load sharing selected), the second period follows the first period, and the first period follows the second period resulting in a continuous switching of the user attached monitor device from a power saving mode to an operational mode.

In some cases, the load switch schedule is a simple default schedule where the user attached monitor device is fully operational for some defined period, such as, for example, twenty (20) minutes, and is at least partially turned off for a subsequent twenty (20) minutes during a time when the user detached monitor device performs a proxy of the functionality previously performed by the user attached monitor device. More complex determinations of determining a load switch schedule may be used. For example, determining the load switch schedule may be based upon a remaining battery in one or both of the user detached monitor device and/or the user attached monitor device and an expected battery usage rate for one or both of the user detached monitor device and/or the user attached monitor device. This information may be used, for example, to determine a load switch schedule that will maximize the amount of time that the monitoring system relying upon the user detached monitor device and the user attached monitor device can continue operating without being recharged. An example of such an data input based approach for determining the load switch schedule is discussed in more detail below in relation to FIG. 9. Based upon the disclosure provided herein, one of ordinary skill in the art will recognize a variety of load switch schedules and/or processes for determining load switch schedules that may be used in relation to different embodiments.

During a first period of the load switch schedule, selected functionality of the user attached monitor device is turned off or otherwise transitioned into a reduced operational mode to conserve power (block 715). The selected functionality may include any functionality available from the user attached monitor device that has a reasonable proxy in the user detached monitor device. For example, where both the user attached monitor device and the user detached monitor device include location determination capability, the location determination capability of the user attached monitor device may be turned off to conserve power. It is noted that the location determination capability of the user detached monitor device may not provide the same information as the corresponding capability of the user attached monitor device because, for example, the user detached monitor device may only be close to the individual being monitored and not directly attached to the individual being monitored such that the location may be slightly different. That said, the location determination capability provides a reasonable proxy for the location information that would have been available from the user attached monitor device. Further, the way the location is determined may be different between the user attached monitor device and the user detached monitor device. For example, the user attached monitor device may have been generating location data based upon information received from a location beacon or from a number of Wi-Fi access points, and in contrast the location determination functionality of the user detached monitor device may be determining location based upon GPS signals. While the way the location is being determined may be different, the location information generated by the user detached monitor device is a reasonable proxy for that which would have been generated by the user attached monitor device.

As another example, where both the user attached monitor device and the user detached monitor device include alcohol detection capability, the alcohol detection capability of the user attached monitor device may be turned off to conserve power. It is noted that the alcohol detection capability of the user detached monitor device may not provide the same information as the corresponding capability of the user attached monitor device. For example, the alcohol detection capability of the user attached monitor device may include transdermal alcohol detection and the alcohol detection capability of the user detached monitor device may be breath-based alcohol detection. That said, the alcohol detection capability provides a reasonable proxy for the alcohol detection capability that would have been used by the user attached monitor device.

As yet another example, where both the user attached monitor device and the user detached monitor device include wide area network communication capability, the wide area network communication functionality of the user attached monitor device may be turned off to conserve power and instead relevant data from the user attached monitor device transmitted via a local communication link to the user detached monitor device. It is noted that the wide area network communication functionality of the user detached monitor device may not transmit data to a central monitor using the same transmission path or protocols as would have been used by the user attached monitor device, but the transmission process offered by the user detached monitor device is a reasonable proxy for the disabled functionality in the user attached monitor device.

The process of turning off functionality of the user attached monitor device may include disabling multiple functions (e.g., both wide area network communication functionality and location determination functionality, or all of wide area network communication functionality, alcohol detection functionality, and location determination functionality).

In addition, the proxy functionality of the user detached monitor device is enabled (block 720). This enabling may include, for example, turning on functionality that was not previously operational in the user detached monitor device or leaving functionality that was previously operating on the user detached monitor device operational. Thus, for example, where the location determination functionality of the user attached monitor device was disabled, the location determination functionality of the user detached monitor device is enabled.

With the enabling and disabling processes complete, a user detached proxy mode is engaged where the user detached monitor device performs proxy functionality in place of the functionality that would have been performed by the user attached monitor device (block 725). Thus, for example, where the selected functionality is location determination functionality, the location determination functionality of the user detached monitor device is used to track the location of the individual being monitored. Further, in accordance with an update schedule and/or upon request from a central monitoring station, the location information developed using the location determination functionality of the user detached monitor device is uploaded to the central monitoring station. As another example, where the selected functionality is alcohol detection functionality, the alcohol detection functionality of the user detached monitor device is used to perform alcohol detection and where required or requested to upload the results of the detection to the central monitoring station. As yet another example, where the selected functionality is wide area network communication functionality, the wide area network communication functionality of the user detached monitor device is used to perform all communications with the central monitoring station. Thus, for example, if the central monitoring station requests information from the user attached monitor device that is not available from the user detached monitor device, the user detached monitor device requests and receives the information from the user attached monitor device via the local communication link. Once received, the user detached monitor device communicates the gathered information to the central monitoring station.

It is determined whether the first period of the load switch schedule has completed (block 730). Where the period has not yet completed (block 730), the user attached monitor device and the user detached monitor device continue operating as described above in relation to block 725. Alternatively, where the period has completed (block 730), a second period begins where the selected functionality of the user attached monitor device is re-enabled or turned on such that it returns to an operational state (block 735), and the corresponding proxy functionality of the user detached monitor device is disabled (block 740). In some cases, this disabling of functionality includes turning the functionality off to save power. In other cases, this disabling of functionality leaves the functionality operational, but the user detached monitor device no longer operates in a proxy mode designed to make up for the functionality in the user attached monitor device that was turned off. During the second period, operation is in a standard mode where the user attached monitor device performs its standard functions and the user detached monitor device performs its standard functions (block 745).

It is determined whether the second period of the load switch schedule has completed (block 750). Where the second period has not yet completed (block 750), the user attached monitor device and the user detached monitor device continue operating as described above in relation to block 745. Alternatively, where the second period has completed (block 750), the next first period begins at block 715. It should be noted that while not shown in flow diagram 700, at any time that battery load sharing is deselected (block 705) or hybrid operation mode is disabled (block 215 of FIG. 2), the processes of blocks 735, 740 are performed, and the user attached monitor device and the user detached monitor device transition to operating as described above in relation to block 745.

Figure 8:
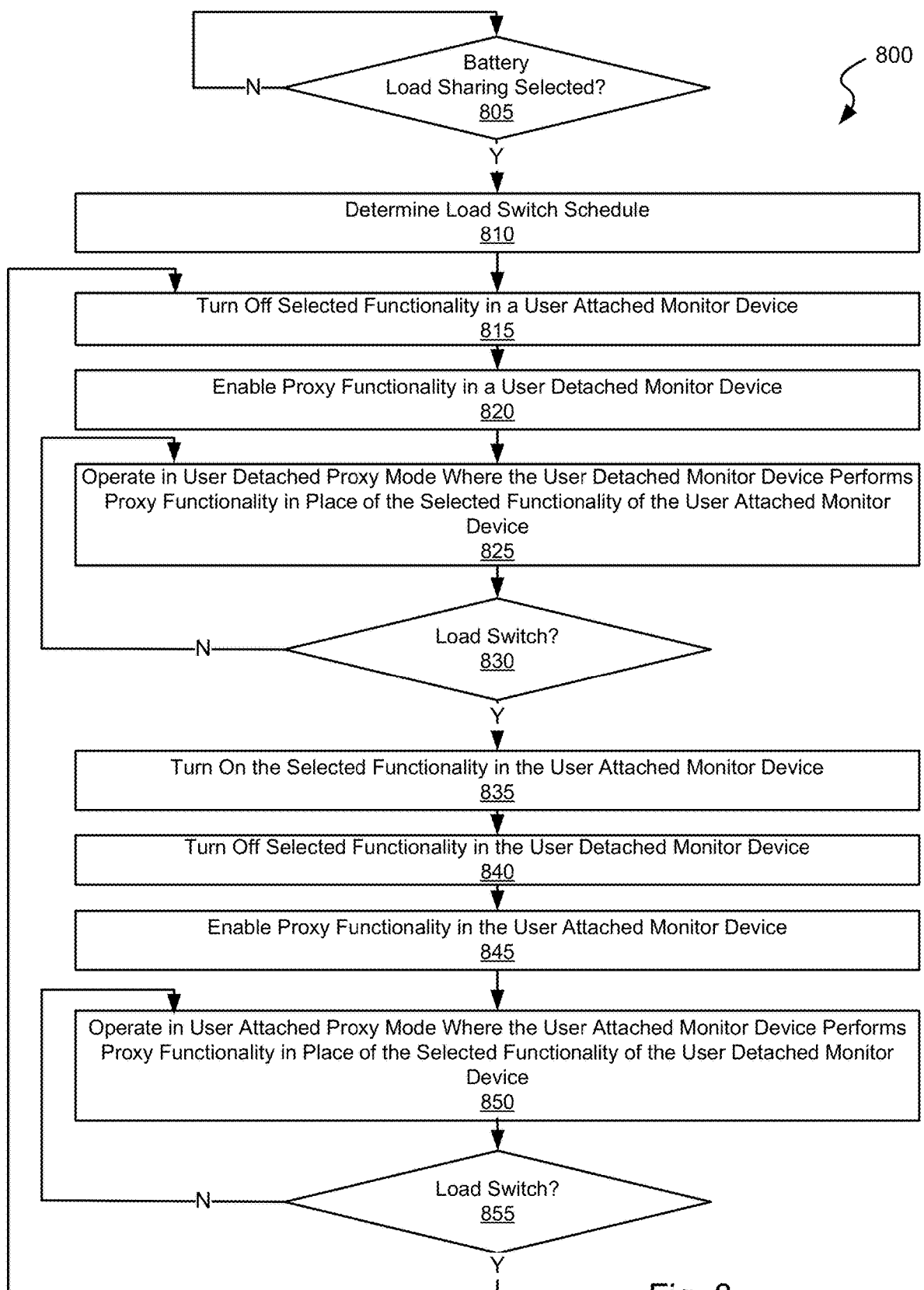
FIG. 8 is a flow diagram showing another method for battery load sharing between a user attached monitor device and a user detached monitor device in accordance with various embodiments.

Turning to FIG. 8, a flow diagram 800 shows another method for battery load sharing between a user attached monitor device and a user detached monitor device in accordance with various embodiments. Following flow diagram 800, it is determined whether battery load sharing is desired when hybrid mode is operational (block 805). Hybrid operational mode is selected using a process similar to that discussed above in relation to FIG. 2. This determination may be made by one or both of the user detached monitor device and/or the user attached monitor device. In some embodiments, a monitoring person setting up the user detached monitor device and/or the user attached monitor device may select a setting indicating that where possible (e.g., where hybrid mode is enabled) battery load sharing should be used. Alternatively, or in addition, a setting change may be performed remotely by downloading an update to one or both of the user detached monitor device and/or the user attached monitor device. Thus, as an example, a request to perform battery load sharing may be downloaded from central monitoring station 160 to one or both of user detached monitor device 120 and/or user attached monitor device 110.

Where battery load sharing is selected (block 805), a load switch schedule is determined (block 810). In this embodiment, the load switch schedule indicates: a first time period during which functionality of a user attached monitor device is disabled to save power, while proxy functionality in a user detached monitor device is enabled to provide similar results to that achievable using an enabled user attached monitor device; and a second time period during which functionality of a user attached monitor device is re-enabled to allow the user attached monitor device to perform its functionality, and corresponding functionality in the user detached monitor device is disabled to save power. Without a change in status (i.e., hybrid mode of operation and battery load sharing selected), the second period follows the first period, and the first period follows the second period resulting in a continuous switching of the user attached monitor device from a power saving mode to an operational mode, and correspondingly continuous switching of the user detached monitor device from an operational mode to a power saving mode.

In some cases, the load switch schedule is a simple default schedule where the user attached monitor device is fully operational for some defined period, such as, for example, twenty (20) minutes, and is at least partially turned off for a subsequent twenty (20) minutes during a time when the user detached monitor device performs a proxy of the functionality previously performed by the user attached monitor device. More complex determinations of determining a load switch schedule may be used. For example, determining the load switch schedule may be based upon a remaining battery in one or both of the user detached monitor device and/or the user attached monitor device and an expected battery usage rate for one or both of the user detached monitor device and/or the user attached monitor device. This information may be used, for example, to determine a load switch schedule that will maximize the amount of time that the monitoring system relying upon the user detached monitor device and the user attached monitor device can continue operating without being recharged. An example of such an data input based approach for determining the load switch schedule is discussed in more detail below in relation to FIG. 9. Based upon the disclosure provided herein, one of ordinary skill in the art will recognize a variety of load switch schedules and/or processes for determining load switch schedules that may be used in relation to different embodiments.

During a first period of the load switch schedule, selected functionality of the user attached monitor device is turned off or otherwise transitioned into a reduced operational mode to conserve power (block 815). The selected functionality may include any functionality available from the user attached monitor device that has a reasonable proxy in the user detached monitor device. For example, where both the user attached monitor device and the user detached monitor device include location determination capability, the location determination capability of the user attached monitor device may be turned off to conserve power. It is noted that the location determination capability of the user detached monitor device may not provide the same information as the corresponding capability of the user attached monitor device because, for example, the user detached monitor device may only be close to the individual being monitored and not directly attached to the individual being monitored such that the location may be slightly different. That said, the location determination capability provides a reasonable proxy for the location information that would have been available from the user attached monitor device. Further, the way the location is determined may be different between the user attached monitor device and the user detached monitor device. For example, the user attached monitor device may have been generating location data based upon information received from a location beacon or from a number of Wi-Fi access points, and in contrast the location determination functionality of the user detached monitor device may be determining location based upon GPS signals. While the way the location is being determined may be different, the location information generated by the user detached monitor device is a reasonable proxy for that which would have been generated by the user attached monitor device.

As another example, where both the user attached monitor device and the user detached monitor device include alcohol detection capability, the alcohol detection capability of the user attached monitor device may be turned off to conserve power. It is noted that the alcohol detection capability of the user detached monitor device may not provide the same information as the corresponding capability of the user attached monitor device. For example, the alcohol detection capability of the user attached monitor device may include transdermal alcohol detection and the alcohol detection capability of the user detached monitor device may be breath-based alcohol detection. That said, the alcohol detection capability provides a reasonable proxy for the alcohol detection capability that would have been used by the user attached monitor device.

As yet another example, where both the user attached monitor device and the user detached monitor device include wide area network communication capability, the wide area network communication functionality of the user attached monitor device may be turned off to conserve power and instead relevant data from the user attached monitor device transmitted via a local communication link to the user detached monitor device. It is noted that the wide area network communication functionality of the user detached monitor device may not transmit data to a central monitor using the same transmission path or protocols as would have been used by the user attached monitor device, but the transmission process offered by the user detached monitor device is a reasonable proxy for the disabled functionality in the user attached monitor device.

The process of turning off functionality of the user attached monitor device may include disabling multiple functions (e.g., both wide area network communication functionality and location determination functionality, or all of wide area network communication functionality, alcohol detection functionality, and location determination functionality).

In addition, the proxy functionality of the user detached monitor device is enabled (block 820). This enabling may include, for example, turning on functionality that was not previously operational in the user detached monitor device or leaving functionality that was previously operating on the user detached monitor device operational. Thus, for example, where the location determination functionality of the user attached monitor device was disabled, the location determination functionality of the user detached monitor device is enabled.

With the enabling and disabling processes complete, a user detached proxy mode is engaged where the user detached monitor device performs proxy functionality in place of the functionality that would have been performed by the user attached monitor device (block 825). Thus, for example, where the selected functionality is location determination functionality, the location determination functionality of the user detached monitor device is used to track the location of the individual being monitored. Further, in accordance with an update schedule and/or upon request from a central monitoring station, the location information developed using the location determination functionality of the user detached monitor device is uploaded to the central monitoring station. As another example, where the selected functionality is alcohol detection functionality, the alcohol detection functionality of the user detached monitor device is used to perform alcohol detection and where required or requested to upload the results of the detection to the central monitoring station. As yet another example, where the selected functionality is wide area network communication functionality, the wide area network communication functionality of the user detached monitor device is used to perform all communications with the central monitoring station. Thus, for example, if the central monitoring station requests information from the user attached monitor device that is not available from the user detached monitor device, the user detached monitor device requests and receives the information from the user attached monitor device via the local communication link. Once received, the user detached monitor device communicates the gathered information to the central monitoring station.

It is determined whether the first period of the load switch schedule has completed (block 830). Where the period has not yet completed (block 830), the user attached monitor device and the user detached monitor device continue operating as described above in relation to block 825. Alternatively, where the period has completed (block 830), a second period begins where the selected functionality of the user attached monitor device is re-enabled or turned on such that it returns to an operational state (block 835), and the corresponding selected functionality of the user detached monitor device is disabled or turned off (block 840). In some cases, this disabling of functionality includes turning the functionality off to save power. In other cases, this disabling of functionality leaves the functionality operational, but the user detached monitor device no longer operates in a proxy mode designed to make up for the functionality in the user attached monitor device that was turned off.

In addition, the proxy functionality of the user attached monitor device is enabled (block 845). This enabling may include, for example, turning on functionality that was not previously operational in the user attached monitor device or simply engaging the user attached monitor device to take over performing the function of the functionality on behalf of the user detached monitor device. Thus, for example, where the wide area network communication functionality of the user detached monitor device is disabled or turned off, the user attached monitor device is enabled to perform all communications with the central monitoring station.

With the enabling and disabling processes complete, a user attached proxy mode is engaged where the user attached monitor device performs proxy functionality in place of the functionality that would have been performed by the user detached monitor device (block 845). This enabling may include, for example, turning on functionality that was not previously operational in the user attached monitor device or simply engaging the user attached monitor device to take over performing the function of the functionality on behalf of the user detached monitor device. Thus, for example, where the wide area network communication functionality of the user detached monitor device is disabled or turned off, the user attached monitor device is enabled to perform all communications with the central monitoring station.

The system proceeds to operate during the second period in a user attached proxy mode where the user attached monitor device performs proxy functionality in place of the selected functionality of the user detached monitor device (block 850). Thus, for example, where the selected functionality is the wide area network communication functionality, any information requested or scheduled to be uploaded from the user detached monitor device to the central monitoring station is done using the wide area network communication functionality of the user attached monitor device. In particular, the user attached monitor device communicates via the local communication link to obtain the requested or scheduled information, and then uploads received information to the central monitoring station using the wide area network communication functionality of the user attached monitor device.

It is determined whether the second period of the load switch schedule has completed (block 855). Where the second period has not yet completed (block 855), the user attached monitor device and the user detached monitor device continue operating as described above in relation to block 850. Alternatively, where the second period has completed (block 855), the next first period begins at block 815. It should be noted that while not shown in flow diagram 800, at any time that battery load sharing is deselected (block 805) or hybrid operation mode is disabled (block 215 of FIG. 2), all functionality of both the user detached monitor device and the user attached monitor device is re-enabled and the user attached monitor device and the user detached monitor device transition to non-hybrid operational modes that do not rely on battery load sharing.

Figure 9:
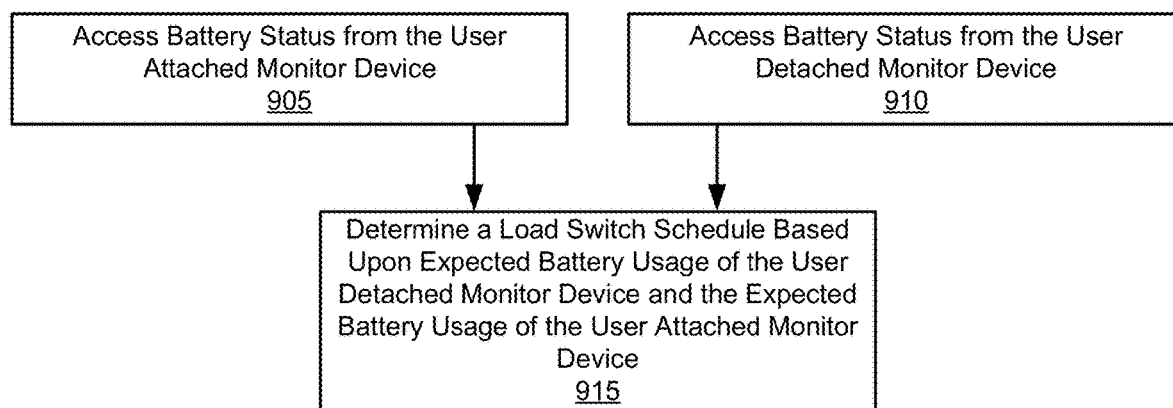
FIG. 9 is a flow diagram showing a method for battery load switch scheduling in accordance with some embodiments.

Turning to FIG. 9, a flow diagram 900 shows a method for battery load switch scheduling in accordance with some embodiments. Following flow diagram 900, battery status from the attached monitor device is accessed (block 905) and battery status from the detached monitor device is accessed (block 910). A load switch schedule is determined based upon the battery status of the user attached monitor device, the battery status of the user detached monitor device, the expected battery usage of the user attached monitor device, and the expected battery usage of the user detached monitor device (block 915). Thus, as just one example, where the battery status indicates 80 (eighty percent) charged for both the user detached monitor device and the user attached monitor device, and the user detached monitor device is expected to use its battery at half the rate of the user attached monitor device, a load switching schedule that switches the load more often to the user detached monitor device than to the user attached monitor device. Where the goal is to extend the battery life of both the user attached monitor device and the user detached monitor device so that the battery in each device is exhausted at about the same time, a first time for offloading from one device to the other device and a second time for offloading from the other device to the one device can be modified relative to one another where based upon the initial battery status of the devices and the relative rate at which battery is used in the respective devices. This process of determining the battery load switch scheduling may be done one time or may be repeated periodically using updated battery status information. Based upon the disclosure provided herein, one of ordinary skill in the art will appreciate a variety of approaches that may be used for determining a battery load switch schedule in accordance with different embodiments.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for extending battery life in a monitoring system, the monitoring system comprising:
   providing a user attached monitor, wherein the user attached monitor includes:
      an attachment element configured to attach to a limb of an individual being monitored;
      a tamper sensor configured to indicate removal of the user attached monitor from the individual being monitored;
      a first circuitry to perform a first functionality of the user attached monitor device; and
      a first local communication circuit operable to communicate with a second local communication circuit of a user detached monitor;
   providing the user detached monitor, wherein the user detached monitor includes:
      a second circuitry operable to perform a second functionality of the user detached monitor device, wherein the second functionality is a proxy of the first functionality;
      the second local communication circuit operable to:
         communicate with the first local communication circuit of the user attached monitor;
   during a first period, reducing a power consumption of the user attached monitor device by disabling the first circuitry and providing a proxy of the first functionality using the second circuitry of the user detached monitor device; and
   during a second period, re-enabling the first circuitry and providing the first functionality using the first circuitry of the user attached monitor device.

2. The method of claim 1, the method further comprising:
   during the second period, reducing power consumption of the user attached monitor device by disabling the second circuitry and providing a proxy of the second functionality using the first circuitry of the user attached monitor device.

3. The method of claim 1, the method further comprising:
   determining that the user attached monitor device is within a local communication range of the user detached monitor device by establishing communication between the first local communication circuit and the second local communication circuit; and wherein the reducing the power consumption of the user attached monitor device by disabling the first circuitry and providing the proxy of the first functionality using the second circuitry of the user detached monitor device only occurs when the user detached monitor device and the user attached monitor device are within local communication range.

4. The method of claim 1, wherein the second circuitry comprises a computer readable medium including instructions executable by a processor to at least in part perform the second functionality.

5. The method of claim 1, wherein the first circuitry comprises a computer readable medium including instructions executable by a processor to at least in part perform the first functionality.

6. The method of claim 1, wherein the first functionality is selected from a group consisting of: a location determination functionality; an alcohol detection functionality; a wide area network communication functionality; a combination of the location determination functionality and the alcohol detection functionality; a combination of the location determination functionality and the wide area network communication functionality; a combination of the location determination functionality, the alcohol detection functionality, and the wide area network communication functionality; and a combination of the alcohol detection functionality and the wide area network communication functionality.

7. A monitoring system, the monitoring system comprising:
   a user attached monitor, wherein the user attached monitor includes:
      an attachment element configured to attach to a limb of an individual being monitored;
      a tamper sensor configured to indicate removal of the user attached monitor from the individual being monitored;
      a first status monitor operable to determine a first status of the individual being monitored;
      a first local communication circuit operable to communicate with a second local communication circuit of a user detached monitor; and
   the user detached monitor, wherein the user detached monitor includes:

a second status monitor operable to determine a second status of the individual being monitored;

the second local communication circuit operable to:
communicate with the first local communication circuit of the user attached monitor; and
indicate a successful communication with the user attached monitor;

a computer readable medium including instructions executable by a processor to enable a hybrid mode of operation where a portion of operations performed by one of the user detached monitor or the user attached monitor is modified in part because of the indication of a successful communication with the user attached monitor.

8. The monitoring system of claim 7, wherein the first status is selected from a group consisting of: a location, a motion indication, a tamper indication, and an alcohol detection.

9. The monitoring system of claim 7, wherein the first status monitor is selected from a group consisting of: a GPS location circuit, a cell tower triangulation location circuit, a Wi-Fi based location circuit, a motion sensor, a tamper sensor, and a biometric sensor.

10. The monitoring system of claim 7, wherein the second status is selected from a group consisting of: a location, a photo, a finger print, and an audio recording.

11. The monitoring system of claim 7, wherein the first status monitor is selected from a group consisting of: a GPS location circuit, a temperature sensor circuit, a camera, and a microphone.

12. The monitoring system of claim 7, wherein the first local communication circuit and the second local communication circuit are operable to communicate via a protocol selected from a group consisting of: a BlueTooth™ protocol, and a Wi-Fi protocol.

13. The monitoring system of claim 7, wherein the portion of operations performed by one of the user detached monitor or the user attached monitor modified in part because of the indication of a successful communication with the user attached monitor is selected from a group consisting of: changing location detection of the individual being monitored from the user attached monitor to the user detached monitor, changing communication to a central control from the user attached monitor to the user detached monitor, changing a check-in from the user attached monitor to the user detached monitor, and changing a check-in from the user detached monitor to the user attached monitor.

14. A monitoring system, the monitoring system comprising:
a user detached monitor identified as controlled by an individual being monitored, wherein the user detached monitor includes:
a status monitor operable to determine a status of the individual being monitored;
a local communication circuit configured to:
communicate with a user attached monitor that is physically attached to the individual being monitored; and
indicate a successful communication with the user attached monitor; and
a computer readable medium including instructions executable by a processor to enable a hybrid mode of operation where an operation for which the user attached monitor is configured to perform is performed instead by the user detached monitor.

15. The monitoring system of claim 14, wherein the operation for which the user attached monitor is configured to perform is reporting a low battery status of the user attached monitor to a central monitor.

16. The monitoring system of claim 15, the computer readable medium further includes instructions executable by the processor to alert the individual being monitored of the low battery status of the user attached monitor, and wherein the alert is provided to the individual being monitored via a user interface selected from one or more of: a display of the user detached monitor, a speaker of the user detached monitor, or a vibrator of the user detached monitor.

17. The monitoring system of claim 15, wherein reporting the low battery status of the user attached monitor to the central monitor is performed via a cellular telephone network.

18. The monitoring system of claim 14, wherein the operation for which the user attached monitor is configured to perform is determining a location of the individual being monitored, and wherein the computer readable medium further includes instructions executable by the processor to: enable location updates on the user detached monitor, determine whether the user attached monitor is within communication range of the user detached monitor, and communicate at least a portion of the location updates to a central monitor.

19. The monitoring system of claim 14, wherein the operation for which the user attached monitor is configured to perform is performing a scheduled check-in, and wherein the computer readable medium further includes instructions executable by the processor to: alert the individual being monitored of a check-in requirement, and receive input from the individual being monitored via a user interface of the user detached monitor, and report at least a portion of the input received from the individual being monitored to a central monitor.

20. The monitoring system of claim 19, wherein the user interface includes one or more of: a microphone, a touch screen, a camera, a biometric sensor, or a temperature sensor.

21. The monitoring system of claim 19, wherein performing the scheduled check-in is requested as an automatic check-in performed by the user attached monitor, and the scheduled check-in is changed to a manual check-in performed by the user detached monitor.

22. The monitoring system of claim 21, wherein the automatic check-in and the manual check-in gather different data about the individual being monitored.

23. The monitoring system of claim 21, wherein the automatic check-in and the manual check-in gather the same class of data about the individual being monitored.

24. The monitoring system of claim 14, wherein the local communication circuit is a first local communication circuit, the monitoring system further comprising:
the user attached monitor, wherein the user attached monitor includes:
an attachment element configured to attach to a limb of the individual being monitored;
a tamper sensor configured to indicate removal of the user attached monitor from the individual being monitored; and
a second local communication circuit operable to communicate with the first local communication circuit of the user detached monitor.

25. A monitoring system, the monitoring system comprising:
a user attached monitor, the user attached monitor including:

an attachment element configured to attach to a limb of an individual being monitored;

a tamper sensor configured to indicate removal of the user attached monitor from the individual being monitored;

a first local communication circuit operable to communicate with a second local communication circuit of a user detached monitor; and a computer readable medium including instructions executable by a processor to enable a hybrid mode of operation where an operation for which the user detached monitor is configured to perform is performed instead by the user attached monitor.

26. The monitoring system of claim 25, wherein the operation for which the user detached monitor is configured to perform is performing a scheduled check-in, and wherein the computer readable medium further includes instructions executable by the processor to perform the check-in by the user attached monitor and report a result of the check-in to a central monitor.

27. The monitoring system of claim 25, the monitoring system further comprising:

the user detached monitor, wherein the user detached monitor is identified as controlled by an individual being monitored, and wherein the user detached monitor includes:

a status monitor operable to determine a status of the individual being monitored; and the second local communication circuit configured to:
communicate with the user attached monitor; and
indicate a successful communication with the user attached monitor.

* * * * *